US005504940A

United States Patent [19]

Hahs, Jr. et al.

[11] Patent Number: 5,504,940
[45] Date of Patent: Apr. 2, 1996

[54] SHOCK ISOLATION SYSTEM HAVING INTEGRAL ELECTRICAL INTERCONNECTS

[75] Inventors: Charles A. Hahs, Jr., Boca Raton; Gustavo G. Suarez, Deerfield Beach; Daniel R. Troutman, Boca Raton, all of Fla.

[73] Assignee: Motorola, Inc., Schaumburg, Ill.

[21] Appl. No.: 359,355

[22] Filed: Dec. 19, 1994

Related U.S. Application Data

[63] Continuation of Ser. No. 976,040, Nov. 13, 1992, abandoned.

[51] Int. Cl.⁶ .................. H04B 1/08; H05K 5/00
[52] U.S. Cl. ............. 455/38.1; 455/351; 439/66; 340/825.44; 361/790; 361/814
[58] Field of Search .................. 455/89, 90, 347, 455/348, 351, 38.1; 340/825.46, 825.44; 361/790, 814; 439/66

[56] References Cited

U.S. PATENT DOCUMENTS

| | | | |
|---|---|---|---|
| 3,290,636 | 12/1966 | Overtveld | 439/66 |
| 3,832,603 | 8/1974 | Cray et al. | 361/790 |
| 4,029,375 | 6/1977 | Gabrielian | 439/66 |
| 4,558,396 | 12/1985 | Kawabata et al. | 455/347 |
| 4,558,427 | 12/1985 | Takeuchi et al. | |
| 4,577,735 | 3/1986 | Mooney et al. | |
| 4,578,612 | 3/1986 | Mooney | |
| 4,961,709 | 10/1990 | Noschese | 439/66 |
| 5,007,842 | 4/1991 | Deak et al. | 439/66 |
| 5,030,109 | 7/1991 | Dery | 439/66 |
| 5,272,475 | 12/1993 | Eaton et al. | 455/38.3 |
| 5,307,508 | 4/1994 | Rollins et al. | 455/351 |

OTHER PUBLICATIONS

Motorola Technical Publication entitled "Shock Isolator Installation Indicator", by Tribbey et al., published May, 1992 by Motorola, Inc. of Schaumberg, Illinois.

Primary Examiner—Andrew I. Faile
Attorney, Agent, or Firm—Kelly A. Gardner; Daniel K. Nichols; John H. Moore

[57] ABSTRACT

An apparatus (100) comprises a first electronic device (105, 110), a second electronic device (120, 125), and a shock isolation system (145, 305). The shock isolation system (145, 305) comprises a shock isolator (145) positioned between the first electronic device (105, 110) and the second electronic device (120, 125) for absorbing mechanical shocks, wherein the shock isolator (145) has at least one aperture (310) formed therein. The shock isolation system (145, 305) further comprises at least one electrical interconnect (305) disposed within the at least one aperture (305) and extending therefrom for electrically coupling the first electronic device (105, 110) to the second electronic device (120, 125).

14 Claims, 2 Drawing Sheets

SHOCK ISOLATION SYSTEM HAVING INTEGRAL ELECTRICAL INTERCONNECTS

This is a continuation of application Ser. No. 07/976,040 filed on Nov. 13, 1992 abandoned.

FIELD OF THE INVENTION

This invention relates in general to shock isolators for absorbing mechanical shocks, and more specifically to a shock isolation system having integral electrical interconnects.

BACKGROUND OF THE INVENTION

Modern electronic devices, such as data communication receivers, typically include numerous electronic components mounted on a printed circuit (pc) board. Interconnections between the components are commonly provided by a circuit pattern, i.e., conductive runners and component mounting pads, printed on the pc board. These interconnections can become quite complex, often justifying the use of multi-layer pc boards to electrically couple all of the components.

In many cases, the large number of electronic components utilized by an electronic device requires that multiple pc boards be included within the electronic device. In such a case, interconnections between the pc boards, as well as interconnections between the components, are of concern. Conventionally, the interconnections between pc boards have been provided by wires coupled between the pc boards or connectors soldered to each of the pc boards that electrically and mechanically couple when the electronic device is assembled.

However, the interconnection of wires between different pc boards is a manual process in which errors can easily occur. For example, a human operator could easily solder the interconnecting wires to the incorrect locations on the pc boards. Additionally, if the operator solders the wires improperly, electrical shorts or opens could cause the electronic device to operate incorrectly. If an error does occur, time is wasted in which the electronic device must be tested to determine the source of the error. The electronic device may thereafter be repaired, if possible, or discarded. In either situation, the error results in an overall increased manufacturing cost, which is typically reflected in an increased consumer cost for the final product.

On the other hand, most conventional connectors may be assembled to pc boards using automated pick-and-place equipment and automated reflow equipment, eliminating many of the human errors associated with wire interconnections. The automated assembly process, however, is not entirely free from errors and sometimes results in alignment problems, usually caused by placement or reflow errors, when the pc boards are assembled together. In such a case, the misaligned connector must be removed from the pc board, a process which requires the application of intense heat to the pc board. As a result, other electronic components in the vicinity of the misaligned connector may be inadvertently reflowed and removed from the correct alignment. These errors, like the ones described above, result in increased manufacturing costs which are reflected at the consumer level.

Furthermore, even if wires or other conventional connectors are correctly assembled to interconnect pc boards, problems may occur during operation of the electronic device. For instance, if the electronic device is subject to mechanical shocks, such as when dropped or impacted, the interconnected pc boards may be displaced, possible causing the breakage of the interconnection.

Thus, what is needed is a method for interconnecting printed circuit boards that is self-aligning. Additionally, the interconnection of the printed circuit boards should not be subject to breakage when the electronic device housing the printed circuit boards is dropped or impacted.

SUMMARY OF THE INVENTION

A shock isolation system for interconnecting at least two electronic devices includes a shock isolator positioned between the at least two electronic devices for absorbing mechanical shocks. The shock isolator has at least one aperture formed therein and at least one electrical interconnect disposed within the at least one aperture and extending therefrom. The at least one aperture positions the at least one electrical interconnect for electrically coupling the at least two electronic devices, and the at least one electrical interconnect is held, without solder, in electrical contact with the at least two electronic devices by the shock isolator when the shock isolation system is assembled.

The shock isolator further includes a protrusion integrally formed into a wall of the at least one aperture for securely holding the at least one electrical interconnect within the at least one aperture. The at least one electrical interconnect is securely held in contact with the at least two electronic devices when the shock isolation system is assembled.

DESCRIPTION OF A PREFERRED EMBODIMENT

Figure 1:
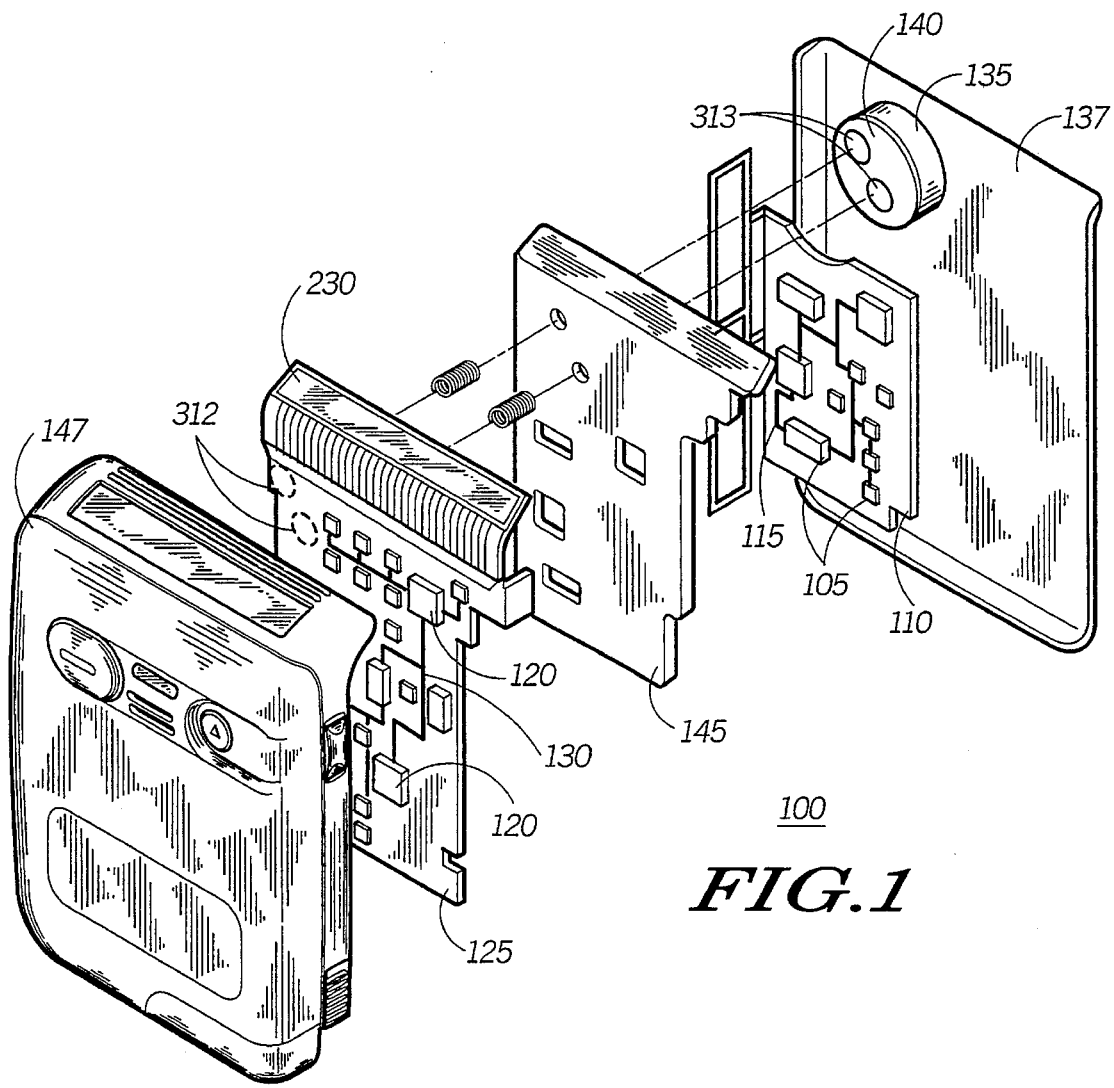
FIG. 1 is an exploded view of a data communication receiver in accordance with a preferred embodiment of the present invention.

FIG. 1 depicts an exploded view of a data communication receiver 100 in accordance with a preferred embodiment of the present invention. The data communication receiver 100 comprises electronic circuitry for receiving a radio frequency (RF) signal and decoding therefrom a selective call message. Preferably,-the electronic circuitry includes at least two electrically coupled printed circuit (pc) boards. For instance, the electronic circuitry could include receiver components 105 mounted on a first printed circuit (pc) board, i.e., a receiver board 110, and a first printed circuit pattern 115 formed on the receiver board 110 for electrically coupling the receiver components 105. Decoder components 120 could be mounted on a second pc board, i.e., a decoder board 125, and a second printed circuit pattern 130 could be formed on the decoder board 125 for electrically coupling the decoder components 120. Alternatively, if the number of components is relatively small, both the receiver and decoder components 105, 120 could be included on a single pc board. According to the present invention, a vibrating motor 135 disposed within a first housing portion 137 is mounted to a third pc board 140.

According to the present invention, the data communication receiver 100 further comprises an elastomeric shock isolator 145 which is positioned between the receiver board 110, the decoder board 125, and the third pc board 140 when the data communication receiver 100 is assembled. The shock isolator 145 is preferably molded to conform to the electronic circuitry such that the receiver and decoder components 105, 120 as well as the pc boards, i.e., receiver board 110, decoder board 125, and third pc board 140, are cushioned against mechanical shocks.

Additionally, in accordance with the preferred embodiment of the present invention, the shock isolator 145 is utilized to electrically couple the decoder board 125 to the third pc board 140, as will be described in further detail below. To complete the assembly of the data communication receiver 100, a second housing portion 147 is secured to the first housing portion 137 to enclose the electronic circuitry and the shock isolator 145. The first and second housing portions 137, 147 may be secured together in a variety of ways, including, but not limited to, ultrasonic welding, screws, or molded latch mechanisms.

Figure 2:
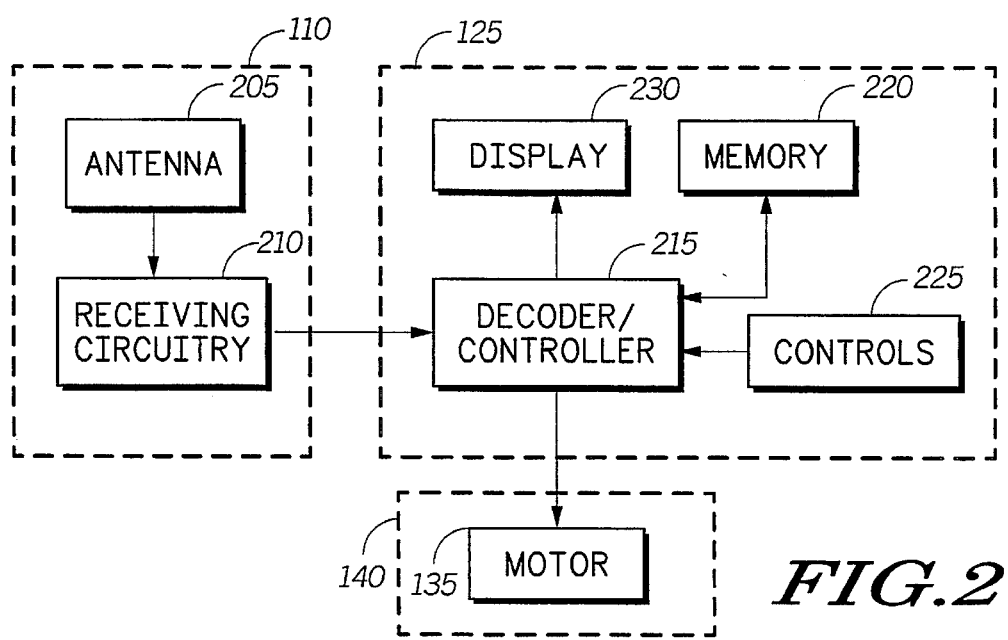
FIG. 2 is an electrical block diagram of the data communication receiver of FIG. 1 in accordance with the preferred embodiment of the present invention.

FIG. 2 is an electrical block diagram of the electronic circuitry included within the data communication receiver 100. The electronic circuitry comprises an antenna 205 for receiving an RF signal and receiving circuitry 210 coupled to the antenna 205 for demodulating the RF signal. The antenna 205 and the receiving circuitry 210 are preferably included on the receiver board 110. The demodulated signal is then provided to a decoder/controller 215, which decodes the signal to recover a selective call message therefrom. The decoder/controller 215 may be, for example, a microcomputer such as the Motorola MC68HC05C4 microcomputer. Alternatively, the decoder/controller 215 may be implemented by hard-wired logic capable of performing the same operations.

The decoded message is subsequently stored by the decoder/controller 215 in a memory 220, such as a random access memory (RAM). Additionally, the decoder/controller 215 provides an activation signal to a transducer, preferably the motor 135, which generates a sensible alert to announce reception of the message to a user. The user may thereafter manipulate controls 225, which are accessible to the user from the exterior of the data communication receiver 100, to send a signal to the decoder/controller 215. In response to reception of the signal, the decoder/controller 215 retrieves the message from the memory 220 and provides it to a display 230, e.g., a liquid crystal display, for presentation to the user.

Preferably, the decoder/controller 215, the memory 220, the controls 225, and the display 230 are mounted on the decoder board 125, and the demodulated signal is provided to the decoder/controller 215 via electrical connectors (not shown) mounted on the decoder and receiver boards 110, 125. As described above, the motor 135 is mounted on the third pc board 140, which is coupled to the decoder board 125 by electrical interconnects disposed within the shock isolator 145, as may be better understood by referring to FIG. 3.

Figure 3:
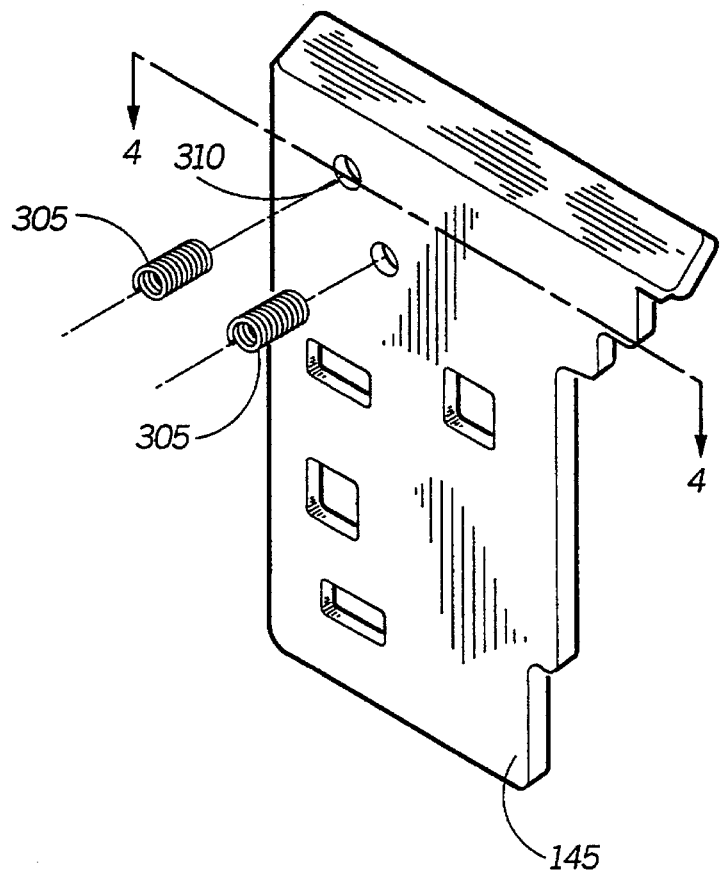
FIG. 3 is a perspective view of a shock isolation system, including shock isolator and electrical interconnects, utilized by the data communication receiver of FIG. 1 in accordance with the preferred embodiment of the present invention.

FIG. 3 is a perspective view of a shock isolation system, which, according to the present invention, includes the shock isolator 145 and the electrical interconnects 305 that couple the decoder board 125 (FIG. 1) to the third pc board 140 (FIG. 1). Preferably, two apertures 310 are formed through the elastomeric material of the shock isolator 145. The electrical interconnects 305 are disposed within the apertures 310 and are of sufficient length to extend from either side of the shock isolator 145. When the data communication receiver 100 is assembled, the shock isolator 145 is sandwiched between the decoder board 125 and the third pc board 140 such that the electrical interconnects 305 contact, at one end, pads 312 (FIG. 1) formed on the decoder board 125 and, at the other end, pads 313 (FIG. 1) formed on the third pc board 140. In this manner, signals are provided from the decoder/controller 215 to the motor 135 via the electrical interconnects 305, which, in accordance with the preferred embodiment of the present invention, are self-aligning electrical contacts.

As described above, the shock isolator 145 is molded to conform to the receiver board 110, the decoder board 125, and the third pc board 140 to which the motor 135 is mounted. The data communication receiver 100, therefore, cannot be assembled if the shock isolator 145 or any of the pc boards are aligned incorrectly. As a result, when the data communication receiver 100 is assembled, the electrical interconnects 305 automatically align with the proper pads on the decoder board 125 and the third pc board 140 without the use of additional alignment equipment, such as automated pick-and-place equipment, thus simplifying the process used to manufacture the data communication receiver 100.

The electrical interconnects 305, as shown, are formed into spring elements, which are preferably constructed from a conductive material, such as beryllium copper, and appropriately plated. The use of spring elements as the electrical interconnects 305 provides for additional shock absorbing capacity within the data communication receiver 100. During a mechanical shock or impact, for instance, movement of the pc boards within the first and second housing portions 137, 147 is dampened by the elastomeric material of the shock isolator 145. Additionally, the electrical interconnects 305, which are sandwiched between the decoder board 125 and the third pc board 140, are able to compress during mechanical shock, thereby preventing possible breakage of the electrical interconnects 305, the decoder board 125, or the third pc board 140. This feature is especially advantageous for use with the third pc board 140, since the motor 135 is disposed within the first housing portion 137 and is thus more vulnerable to mechanical shocks than other components. It may be appreciated by one skilled in the art that, in an alternate embodiment of the present invention, rigid electrical interconnects may be utilized. However, in such an alternate embodiment, damage to the data communication receiver 100 in the areas surrounding the electrical interconnects is more likely.

In still another alternate embodiment of the present invention, electrical interconnects may be disposed within the shock isolator to electrically couple other components, rather than a decoder/controller and a motor, mounted on different pc boards. For example, a multiplicity of electrical interconnects could be utilized to couple the receiver board to the decoder board.

Figure 4:
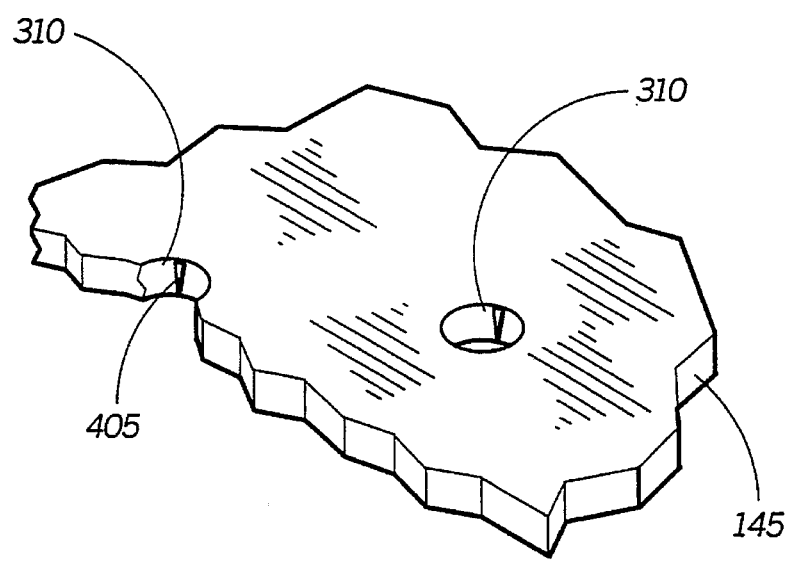
FIG. 4 is a cutaway view along line 4—4 of the shock isolator of FIG. 3 in accordance with the preferred embodiment of the present invention.

Referring next to FIG. 4, a cutaway view of the shock isolator 145 shows an additional feature of the present invention. In accordance with the preferred embodiment of the present invention, each of the apertures 310 has at least one small protrusion 405 formed into the wall of the aperture 310. This protrusion 405 is preferably large enough to securely hold the electrical interconnect 305 within the aperture 310 regardless of small dimensional variances of the electrical interconnect 305 and the shock isolator 145.

Conversely, the protrusion 405 should be small enough such that the electrical interconnect 305 may be easily compressed by the decoder board 125 and the third pc board 140 when the data communication receiver 100 is assembled. In this manner, the electrical interconnects 305 are held by the apertures 310 such that conventional fastening methods, such as soldering or welding, are unnecessary to properly assemble the electrical interconnects 305 within the data communication receiver 100.

In summary, the electronic device in accordance with the preferred embodiment of the present invention, i.e., the data communication receiver, utilizes multiple printed circuit (pc) boards which are insulated from mechanical shocks, i.e., vibrations or impacts, by a shock isolation system positioned between the pc boards. The shock isolation system comprises a shock isolator and electrical interconnects for electrically coupling the pc boards. Preferably, the shock isolator is formed from an elastomeric material and molded to conform to the pc boards and the components mounted to the pc boards. Therefore, movement of the pc boards and the components due to mechanical shock is dampened, thus preventing damage to the electronic device that might otherwise result from the mechanical shock.

The electrical interconnects included in the shock isolation system are preferably spring elements disposed within apertures formed through the elastomeric material of the shock isolator. In accordance with the preferred embodiment of the present invention, the spring elements are held securely by the apertures such that conventional fastening techniques, such as reflow or manual soldering, are unnecessary to ensure proper electrical coupling of the pc boards. Additionally, because the shock isolator is molded to conform to the pc boards, the spring elements are self-aligning. More specifically, the assembly of the electronic device results in the correct alignment of the spring elements with the pc boards, and no additional alignment process is necessary.

A further advantage of the present invention is the added shock absorbency introduced by the use of the spring elements as electrical interconnects. Because the spring elements may be compressed, movement of the pc boards due to mechanical shock results in compression of the spring elements, thus preventing breakages that might otherwise result from collision of the pc boards with rigid electrical interconnects.

It may be appreciated by now that there has been provided a method for interconnecting printed circuit boards that is self-aligning and does not rely on conventional reflow techniques. Additionally, the electrical interconnects utilized in accordance with the present invention provide dampening of mechanical motion due to mechanical shock or impact.

We claim:

1. A shock isolation system for interconnecting at least two electronic devices, comprising:
   a shock isolator positioned between the at least two electronic devices for absorbing mechanical shocks, the shock isolator having at least one aperture formed therein; and
   at least one electrical interconnect disposed within the at least one aperture and extending therefrom, wherein the at least one aperture positions the at least one electrical interconnect for electrically coupling the at least two electronic devices, and wherein the at least one electrical interconnect is held, without solder, in electrical contact with the at least two electronic devices by the shock isolator when the shock isolation system is assembled;
   wherein the shock isolator further includes a protrusion integrally formed into a wall of the at least one aperture for securely holding the at least one electrical interconnect within the at least one aperture, where the at least one electrical interconnect is securely held in contact with the at least two electronic devices when the shock isolation system is assembled.

2. The shock isolation system in accordance with claim 1, wherein the shock isolator is formed from an elastomeric material.

3. The shock isolation system in accordance with claim 1, wherein the at least one electrical interconnect comprises at least one conductive spring element, and wherein the at least one conductive spring element is electrically secured to the at least two electronic devices solely by the shock isolator and the pressure exerted at opposite ends of the at least one conductive spring element by the at least two electronic devices.

4. An apparatus, comprising:
   a first electronic device;
   a second electronic device; and
   a shock isolation system, comprising:
      a shock isolator positioned between the first electronic device and the second electronic device for absorbing mechanical shocks, the shock isolator having at least one aperture formed therein; and
      at least one electrical interconnect disposed within the at least one aperture and extending therefrom, wherein the at least one aperture positions the at least one electrical interconnect for electrically coupling the first electronic device to the second electronic device, and wherein the at least one electrical interconnect is held, without solder, in electrical contact with the first and second electronic devices by the shock isolator when the apparatus is assembled;
   wherein the shock isolator further includes a protrusion integrally formed into a wall of the at least one aperture for securely holding the at least one electrical interconnect within the at least one aperture, where the at least one electrical interconnect is securely held in contact with the first and second electronic devices when the shock isolation system is assembled.

5. The apparatus in accordance with claim 4, wherein the shock isolator is formed from an elastomeric material.

6. The apparatus in accordance with claim 4, further comprising a housing for enclosing the first and second electronic devices with the shock isolation system positioned therebetween.

7. The apparatus in accordance with claim 4, wherein the at least one electrical interconnect comprises at least one conductive spring element, and wherein the at least one conductive spring element is electrically secured to the first and second electronic devices solely by the shock isolator and the pressure exerted at opposite ends of the at least one conductive spring element by the first and second electronic devices.

8. The apparatus in accordance with claim 4, wherein:
   the first electronic device comprises at least a first electronic component mounted on a first printed circuit board and a first printed circuit pattern formed on the first printed circuit board for interconnecting the at least a first electronic component; and
   the second electronic device comprises at least a second electronic component mounted on a second printed circuit board and a second printed circuit pattern formed on the second printed circuit board for interconnecting the at least a second electronic component.

9. The apparatus in accordance with claim 8, wherein the shock isolator is molded to conform to the first and second printed circuit boards and the at least a first electronic component and the at least a second electronic component.

10. A data communication receiver for receiving a radio frequency (RF) signal and decoding therefrom a selective call message, comprising:

a first printed circuit board;

a first electronic circuit comprising at least a first electronic component mounted on the first printed circuit board and a first printed circuit pattern formed on the first printed circuit board for interconnecting the at least a first electronic component;

a second printed circuit board;

a second electronic circuit comprising at least a second electronic component mounted on the second printed circuit board and a second printed circuit pattern formed on the second printed circuit board for interconnecting the at least a second electronic component; and a shock isolation system, comprising:

an elastomeric shock isolator positioned between the first printed circuit board and the second printed circuit board for absorbing mechanical shocks, the shock isolator having at least one aperture formed therein; and at least one electrical interconnect disposed within the at least one aperture and extending therefrom, wherein the at least one aperture positions the at least one electrical interconnect for electrically coupling the first electronic circuit to the second electronic circuit, and wherein the at least one electrical interconnect is held, without solder, in electrical contact with the first and second electrical circuits by the shock isolator when the data communication receiver is assembled;

wherein the shock isolator further includes a protrusion integrally formed into a wall of the at least one aperture for securely holding the at least one electrical interconnect within the at least one aperture, where the at least one electrical interconnect is securely held in contact with the first and second electrical circuits when the shock isolation system is assembled.

11. The data communication receiver in accordance with claim 10, wherein the first electronic circuit comprises a controller for controlling the operation of the data communication receiver and for decoding the selective call message from the RF signal.

12. The data communication receiver in accordance with claim 11, wherein the second electronic circuit comprises an electromechanical motor for generating a sensible alert to announce to a user that the selective call message has been decoded from the RF signal, wherein the electromechanical motor is coupled to and controlled by the controller via the at least one electrical interconnect.

13. The data communication receiver in accordance with claim 10, wherein the shock isolator is molded to conform to the first and second printed circuit boards and the at least a first electronic component and the at least a second electronic component.

14. The data communication receiver in accordance with claim 10, wherein the at least one electrical interconnect comprises at least one conductive spring element, and wherein the at least one conductive spring element is electrically secured to the first and second electrical circuits solely by the shock isolator and the pressure exerted at opposite ends of the at least one conductive spring element by the first and second printed circuit boards.

* * * * *